United States Patent [19]

Mikhail

[11] Patent Number: 5,062,585
[45] Date of Patent: Nov. 5, 1991

[54] DETACHED AND ATTACHED THERMAL SPOILERS FOR KINETIC ENERGY PROJECTILE FINS

[75] Inventor: Ameer G. Mikhail, Bel Air, Md.

[73] Assignee: The United States of America as represented by the Secretary of the Army, Washington, D.C.

[21] Appl. No.: 543,896

[22] Filed: Jun. 26, 1990

[51] Int. Cl.$^5$ .................................................. B64C 3/28
[52] U.S. Cl. ........................................ 244/3.24; 244/91
[58] Field of Search .................................. 244/3.24, 91

[56] References Cited

U.S. PATENT DOCUMENTS 3,782,668  1/1974  Womack et al. ................... 244/3.24
4,693,435  9/1987  Percival et al. ....................... 244/91

Primary Examiner—Mark Hellner
Attorney, Agent, or Firm—Saul Elbaum; Walter R. Baylor

[57] ABSTRACT

A kinetic energy projectile intended to be launched toward a selected target has a projectile body and a plurality of main fins attached to the projectile body to provide stability thereto in flight. A spoiler fin is attached to the projectile body ahead of each associated main fin for reducing the temperature of the main fins during flight of the projectile, and thereby, the burning of the fins in flight. The spoiler fin is adapted and configured to provide the temperature reduction by changing the aerodynamic flow over the edges and surfaces of the associated main fin, and also may be composed of material having a lower coefficient of heat conduction than that of the main fin. A gap of predetermined width is provided between the trailing edge of the spoiler fin and the leading edge of the associated main fin, this width being selected to create recirculating vortices behind the trailing edge of the spoiler fin sufficient to cool the leading edge of the associated main fin. In one embodiment, the spoiler fun is completely separated from the associated main fin by the gap. In another embodiment, the spoiler fin and the associated main fin are formed from a single sheet of material, and are connected by a portion of the common material beneath the gap. In a third embodiment, plurality of gaps may be employed.

6 Claims, 2 Drawing Sheets

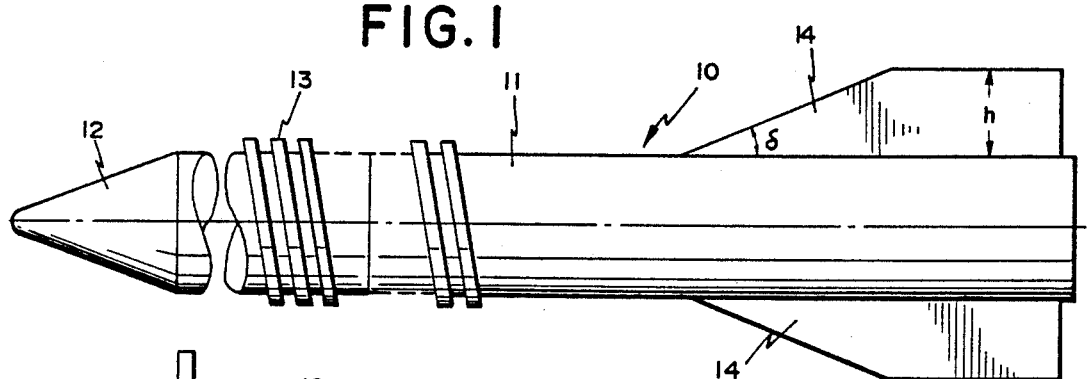
FIG. 1
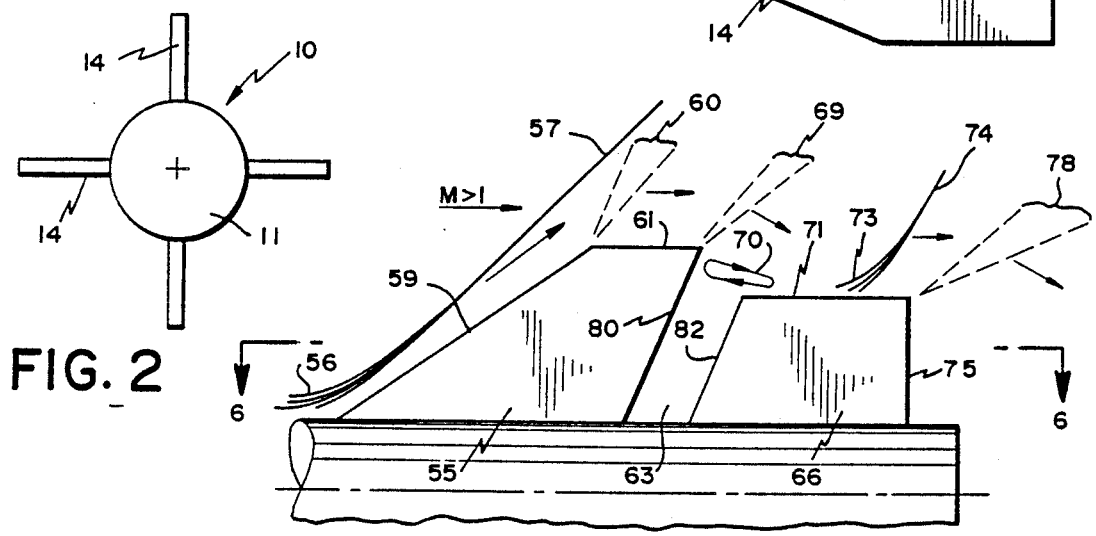
FIG. 2
FIG. 5
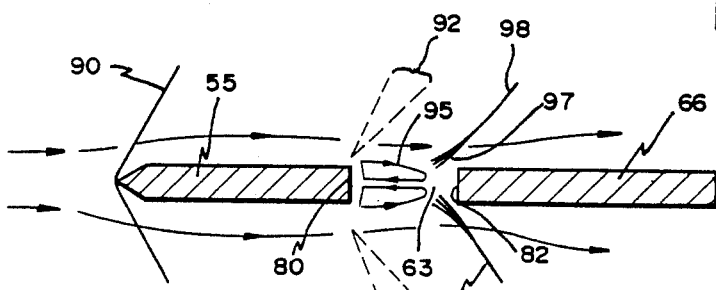
FIG. 6a
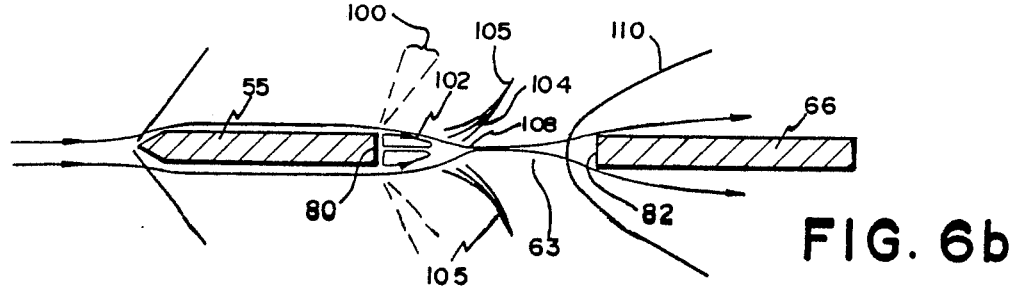
FIG. 6b

DETACHED AND ATTACHED THERMAL SPOILERS FOR KINETIC ENERGY PROJECTILE FINS

RIGHTS OF THE GOVERNMENT

The invention described herein may be manufactured, used and licensed by or for the United States Government for governmental purposes without the payment to me of any royalty thereon.

BACKGROUND OF THE INVENTION

The present invention relates generally to anti armor weaponry, and more particularly to detached and attached thermal spoilers for fins of kinetic energy projectiles.

Typically, kinetic energy projectiles are launched from gun tubes of tanks or other weaponry tubes against enemy tanks or other hard targets to cause total, or at least, partial destruction and thereby disable the target. Damage to the target is caused by the kinetic energy ($\frac{1}{2} \times$ mass $\times$ velocity$^2$) of the projectile, because the projectile contains no explosive charge. Such projectiles are fin-stabilized and therefore, are designed not to undergo significant spin in flight, but rather to maintain a trajectory path with high velocity (usually Mach 5 or higher, equal to 5500 feet per second, or greater) for short flight durations (e.g., from one to three seconds). By the time impact occurs, the projectile fins have been heated to sufficiently high temperature as a result of its velocity, shape and travel distance. The force of the impact causes the projectile and the target structure at the point of impact to disintegrate into fragments capable of igniting the impacted tank's fuel and shells. A direct hit will usually cause an explosion or sufficient damage to be disabling, even if the target is not completely destroyed.

During firing range tests of kinetic energy projectiles it has been found that the fins of the projectile suffer loss of major portions of their surfaces. Such losses are attributable, principally, to in-flight metal burning, and secondarily, to inbore contact with the propellant granules during the projectile release from its propellant charge case. The projectile is typically composed of tungsten or high density material, while the fins are usually of aluminum. Fins retrieved from the fired projectiles show a loss in excess of fifty percent of their original surface area and a substantially degraded fin edge and shape. In particular, the leading edges of the fins of the spent projectile have severe loss of smooth line of the leading edge to become rough-edged, and the shape of the edges usually differ considerably from fin to fin. The surfaces remaining of the different fins mounted on the same projectile also reveal asymmetrical shapes.

It may be tolerated that there be some burning of the fins during flight because less fin material on the projectile increases its penetration on impact. However, if the fin loss is too great or in the wrong place it can cause instability of the projectile during flight. FIGS. 1 and 2 are side and end views, respectively, of a typical prior art kinetic energy projectile 10 in which the body 11 has a large overall length to diameter ratio and the forebody 12 is almost pointed. The projectile has surface groovings 13 and at least one set of multiple fins 14. At typical speeds reached in flight and with such a configuration, the fin axial air resistance force (which is a measure of the drag force) is the major contributor to the total projectile axial resistance force. Accordingly, current design techniques seek to avoid increasing such fin axial resistance force.

It is a principal object of the present invention to passively reduce the fin metal burning during flight of the projectile.

Firing range test results on launched projectiles also demonstrate that the projectile suffers from some yawing (lateral) motion, which causes oblique impact with the target. Although the yawing motion may be small, it tends to prevent complete penetration of the target by the projectile, and is at least partly attributable to lack of symmetrical burning of the multiple fins.

It is a more specific object of the present invention to reduce the fin burning through the use of a shielding (or spoiler) fin, and basic aerodynamic and heat transfer features that aid in reducing fin temperature in flight.

SUMMARY OF THE INVENTION

As in the prior art, a kinetic energy projectile intended to be launched toward a selected target has a projectile body and a plurality of main fins attached to the projectile body to provide stability thereto in flight. According to the present invention, however, a spoiler fin is attached to the projectile body ahead of each associated main fin for reducing the temperature of the main fins during flight of the projectile, and thereby, the burning of the fins in flight.

The spoiler fin in adapted and configured to provide the temperature reduction by changing the aerodynamic flow over the edges and surfaces of the associated main fin, and also may be composed of material having a lower coefficient of heat conduction and higher heat capacitance than that of the main fin. A gap of predetermined width is provided between the trailing edge of the spoiler fin and the leading edge of the associated main fin, this width being selected such as not to create a bow shock at the leading edge of the associated main fin. In one embodiment, the spoiler fin is completely separated from the associated main fin by the gap. In another embodiment, the spoiler fin and the associated main fin are formed from a single sheet of material, and are connected by a portion of the common material beneath the gap. Other embodiments may include a plurality of gap slots.

By installing a detached thermal spoiler ahead of the primary fin (which, as used herein, may be a fin, wing, tail, canard, or other control surface) in a supersonic, short flight-duration vehicle such as a kinetic energy projectile, a considerable reduction in fin temperature may be achieved. The attached spoiler/fin assembly (using a single sheet of material) may be slightly less effective in reducing fin temperature than the detached (completely separated) configuration, because some heat conduction inevitably occurs through the bridge connecting the two fins.

The reduction in in-flight fin metal burning assures that a greater amount of fin surface is available than would otherwise be the case, to produce larger rolling and pitching moments to stabilize the projectile. This enhances the accuracy of the moving projectile and the directness (in contrast to obliqueness) with which it strikes the target. Also, the reduction in fin burning reduces the asymmetry that otherwise results as melting, burning and separation of small metal chunks of the primary fins take place. This produces smaller side forces on the projectile and thus causes reduction in dispersion distances (i.e., less deviation from the target point), and less yawing motion which also lessens the likelihood of oblique impact with the target and consequently enhances target penetration by the projectile.

BRIEF DESCRIPTION OF THE DRAWINGS

The above and still further objects, features and attendant advantages of the invention will be better revealed and understood from a consideration of the following detailed description of a presently preferred embodiment, taken in conjunction with the accompanying drawings in which:

FIGS. 1 and 2 are side and end views of a prior art kinetic energy projectile, as described above:

FIG. 5 is a side view of an embodiment similar to that of FIG. 3a, illustrating the fluid flow configuration across surfaces of the spoiler and the fin, useful for explaining the basic aerodynamic principles relevant to the invention; and FIGS. 6a and 6b are section views taken along the line 6—6 of FIG. 5, illustrating desirable flow configuration resulting from proper selection of spoiler/fin gap width, and undesirable flow configuration resulting from improper selection of such gap width, respectively.

DETAILED DESCRIPTION OF THE PREFERRED EMBODIMENT

Figure 3A:
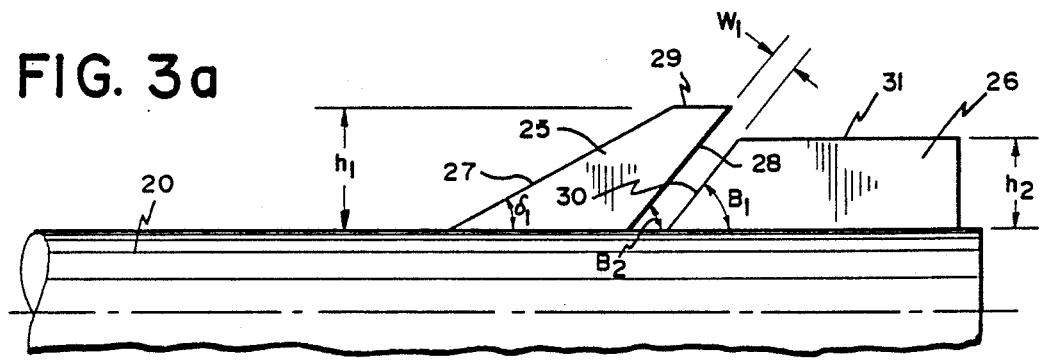
FIGS. 3a and 3b are side views of two presently preferred embodiments of the invention, the FIG. 3a embodiment having a fin and a spoiler which are detached from one another, and the FIG. 3b embodiment having a fin with an attached spoiler.
Figure 3B:
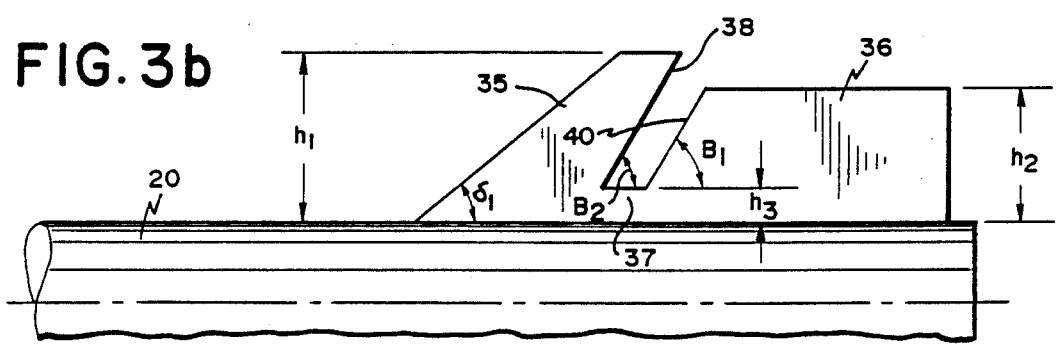

Referring now to FIGS. 3a and 3b of the drawings, two presently preferred embodiments of shielding fin or spoiler fin according to the invention are illustrated therein.

In the embodiment of FIG. 3a the spoiler 25 is completely detached from and mounted ahead of the main fin 26 on the projectile body 20. The combined surface area of both the spoiler and the replacement (main) fin should be comparable to the surface area of the original fin which is replaced by the configuration of fins shown in FIG. 3a. The leading edge 27 of spoiler 25 has a sweep angle $\delta 1$ which may be equal to or slightly different from the sweep angle $\delta$ of the original fin 14 (FIG. 1), to minimize increases in the fin axial air resistance forces. The trailing edge 28 of spoiler 25 has a sweep angle B2. The height of the top edge 29, h1, (i.e., the perpendicular distance from the periphery of the projectile body 20 to that edge) of the spoiler may be equal to or slightly greater than the height of the original fin 14, h.

A gap w1 separates spoiler 25 from fin 26, the width of the gap being chosen according to factors that will be described therein. The leading edge 30 of fin 26 has a sweep angle B1 that may be equal to or slightly different from the sweep angle B2 of the trailing edge of spoiler 25. However, angle B1 should have a magnitude which is close to that of angle $\delta 1$ to minimize increases in the air resistance forces compared with those obtained with original fin 14. The tip or top edge 31 of fin 26 has a height, h2, which is less than the height of the tip 29 of spoiler 25. The thickness of the spoiler is preferably equal to or less than that of the original fin, to maintain air resistance forces not greater than those observed with the original fin configuration of FIG. 1.

The spoiler and fin configuration shown in FIG. 3b is similar to that shown in FIG. 3a, except that the spoiler 35 and fin 36 are connected (attached) and preferably made from a single piece of material 37. The gap between the trailing edge 38 of the spoiler and the leading edge 40 of the fin does not, therefore, extend down to the surface of the body 20 of the projectile. The height of the connecting portion 37 is not highly critical and preferably be made small. The selection of gap width involves considerations similar to those involved in the choice of gap width for the detached spoiler embodiment of FIG. 3a, and is likewise explained below.

Figure 4A:
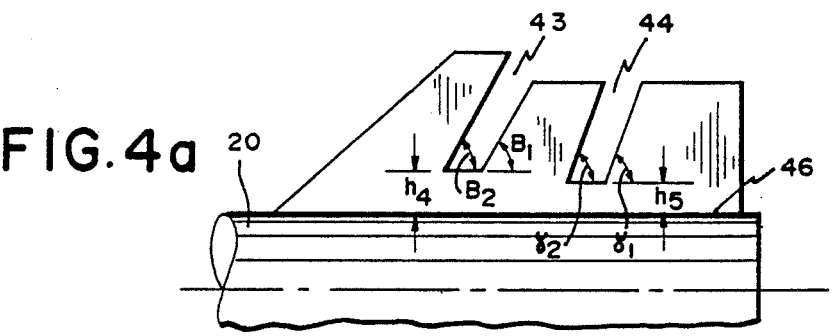
FIG. 4a and 4b are side views of alternative embodiments of the invention, illustrating the use of multiple gaps in the spoiler/fin configuration, and in the fin alone, respectively.

Before discussing the theoretical factors involved in arriving at the preferred embodiments of the invention shown in FIGS. 3a and 3b, reference will be made to design variations of the thermal spoiler concept of the present invention as shown in the alternative embodiments of FIGS. 4a and 4b. In FIG. 4a, the fin configuration is of the attached type, but it may equally well be of the detached type so far as the principles of the invention are concerned. The arrangement is such that multiple gaps are provided in the fin structure. Although only two gaps 43, 44 are used in this embodiment, the number may be greater. Also, the gaps may be of equal or slightly different width. In the embodiment of FIG. 4a, the second gap 44 may have a trailing edge sweep angle $\gamma 1$ which is equal to or different from the leading edge angle $\gamma 2$, and each of these angles may be equal to or different from the corresponding angles B1 and B2 of the first gap 43. Similarly, the height h4, h5 at which each gap commences relative to the periphery 46 of the projectile body 20 may be equal to or different from one another.

Figure 4B:
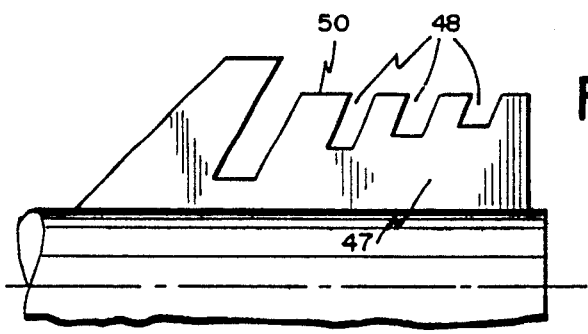

The alternative embodiment of FIG. 4b utilizes a thermal spoiler/fin configuration in which the fin 47 has multiple serrations or short gaps 48 along its tip edge 50. These serrations may be equal or different in depths and widths.

The underlying concept of the present invention is to reduce the material burning or ablation of the fin surface of the projectile by the use of design techniques for passive reduction of the fin surface temperature. Reference is now made to FIG. 5 which is useful to explain the basic flow structure. During supersonic flight of the projectile, compression waves 56 near the root of the spoiler 55 coalesce into a single shock wave 57. The flow then turns parallel to the leading edge 59 of the spoiler and expands through a Prandtl-Meyer expansion fan (generally designated as 60) to follow the tip edge 61 of spoiler 55.

The flow then separates from tip edge 61 across the width of the gap 63 between spoiler 55 and detached fin 66 by going through another Prandtl-Meyer expansion fan 69. A recirculation zone 70 is formed and the flow seeks to move parallel to the tip edge 71 of fin 66 by going through recompression waves 73 which coalesce into a single shock wave 74. The flow cannot then turn downward sufficiently to follow the trailing edge 75 of fin 66. Rather, the flow turns by going through yet another Prandtl-Meyer expansion fan at 78.

A reduction of the temperature of the surface of fin 66, compared to the temperature which would be present at the surface of the fin 14 of the prior art projectile shown in FIG. 1 under the same conditions of flight, is achieved as a result of certain mechanisms and theorems of fluid mechanics and heat transfer. For one thing, less heat conduction to the trailing edge 80 from the high temperature of the leading edge 59 of spoiler 55 may be achieved by selecting the metal of which the spoiler is composed to have a lower coefficient of heat conduction and higher heat capacitance than that of the material of which fin 66 is composed. The high temperature of leading edge 59 arises from confronting the flow (stagnation temperature) and an increase in static temperature attributable to the shock wave 57.

Another mechanism is that heat conduction between the trailing edge 80 of spoiler 55 and leading edge 82 of fin 66 is reduced because of the presence of gap 63 between those two surfaces. That is, the air within gap 63 is a considerably less efficient conductor of heat than any metal of which the spoiler or the fin may be composed.

Still another factor involved in temperature reduction of the fin surface is that leading edge 82 is subjected to a cooling effect from the recirculating vortices formed at recirculation zone 70. This factor is strongly dependent upon the proper selection of the width of gap 63 as will be discussed presently with reference to FIG. 6a.

Yet another mechanism contributing to temperature reduction of the fin material is that the tip edge 71 of fin 66 has a lower temperature as a result of the lower temperature of the flow behind the expansion fan 69. In addition, the stagnant recirculating vortex 70 maintains the top surface of leading edge 82 at a lower temperature. The latter effect is attributable to the shielding of fin 66 from direct exposure to the incoming flow as a result of the presence of spoiler 55. Such cooling effect will continue until the height of the spoiler is reduced to approximately the height of the fin as a consequence of burning of the former in flight.

Accordingly, despite burning of spoiler 55 it serves to shield both the leading edge 82 and the tip edge 71 of fin 66, such that the fin remains at a considerably lower temperature than would otherwise occur. Although fin 66 will begin exposure to higher temperature at its tip edge 71 as the spoiler height is reduced to that of the fin as a result of burning, leading edge 82 remains cooler than it would have been without the spoiler. In essence, the presence of the spoiler delays the exposure of fin 66 to high temperatures over the short duration of the projectile flight.

It will be observed that the present invention achieves a passive reduction of the fin surface temperature, that is, without the use of additional devices or parts, compared to the conventionally designed fins 14 of the prior art projectile of FIG. 1. In this respect, the spoiler or shield fin 55 may be deemed to be a part or extension of replacement fin 66 in the aerodynamic function performed by the overall fin, and this is true whether the spoiler is detached from or attached to the fin.

Referring now to FIG. 6a, the proper width w of the gap 63 between the trailing edge 80 of the spoiler 55 and the leading edge 82 of the fin 66 to induce a lower drag, non-attached flow configuration is determined from the following considerations. FIG. 6a is a section through the spoiler/fin configuration of FIG. 5, taken in a plane parallel to a plane which is tangent to the periphery of the projectile and normal to, the base of the spoiler/fin configuration, as indicated by the section lines 6—6 in FIG. 5. It will be observed from FIG. 6a that the supersonic flow passes through the leading edge shock wave 90, and thereafter flows generally parallel to the fin surface of spoiler 55 back to the trailing edge 80 of the spoiler.

At that point, the flow commences to expand through a Prandtl-Meyer expansion fan 92, and then separates from the wall of the trailing edge to form a circulating region or vortex 95. Thereupon, the flow tends to seek to reattach on itself, but the width w of the gap 63 between the trailing edge 80 of spoiler 55 and the leading edge 82 of fin 66 is sufficiently small to prevent such reattachment from occurring. The flow then prepares itself to meet the leading edge 82 of fin 66 by spawning very weak compression waves 97 which coalesce into a single weak shock wave 98. Thereafter the flow proceeds along and generally parallel to the fin surface of fin 66.

It will be observed, therefore, that leading edge 82 is subjected to a cooling effect by the vortices as a consequence of the proper setting of the width w of gap 63 to be short enough to preclude reattachment of the flow as it passes the trailing edge of the spoiler. This is to be contrasted with the situation in which the width w of the gap 63 is great enough to allow reattachment of the flow, as shown in FIG. 6b. The result is an undesirable, higher drag flow configuration. When the flow reaches the trailing edge 80 of the spoiler and the resulting expansion fan 100, it turns in toward the center axis of the spoiler/fin configuration, thereby creating recirculation vortices 102. The resulting weak compression waves 104 will coalesce into a shock wave 105 which actually commences ahead of the point of attachment 108 of the flow.

The flow then proceeds generally parallel to and virtually along the center axis of the spoiler/fin configuration, and, as it confronts the blunt leading edge 82 of the fin 66, produces a detached bow shock wave 110. If leading edge 82 were sharp rather than blunt, an attached shock wave would instead be formed (i.e., attaching itself to that leading edge). In addition to the loss of any substantial cooling effect on the leading edge 82 from the recirculation vortices, the presence of the strong shock wave 110 produces a higher temperature at the leading edge 82 than would result from the configuration of FIG. 6a. Nevertheless, even the wider gap configuration of FIG. 6b provides the other advantages which were noted earlier herein for the configuration of FIG. 6a, when compared to the absence of a spoiler ahead of and at least partly separated by a gap from the fin, whether the spoiler and fin are detached or attached.

It will thus be seen that the present invention offers significant reduction in fin temperature by installing a thermal spoiler at a proper distance ahead of the fin in a high supersonic, short flight duration projectile. The reduced temperature results in reduced fin metal burning, and consequently lessens the loss of surface area of the fin while the projectile is in flight, compared to projectile fin arrangements found in the prior art. Fin surface area loss is further reduced by choosing a spoiler material having lower heat conduction capability and higher heat capacitance than that of the rear fin metal.

The attached spoiler/fin configuration of FIG. 3b is expected to be slightly less effective than the detached configuration of FIG. 3a because some heat conduction will occur through the bridge of material connecting the spoiler and the fin. The attached configuration also restricts the spoiler and fin to the same material. Among the advantages of such an arrangement, however, is that it is composed of a single integrated piece of material having a slot of appropriate width, leading to lower manufacturing cost and to easier mounting on the projectile in comparison to the detached configuration.

Although certain preferred embodiments of the invention have been shown and described herein, it will be apparent to those skilled in the relevant art that variations and modifications of these embodiments may be implemented without departing from the true spirit and scope of the invention. Accordingly, it is desired that the invention be limited only as required by the appended claims and applicable rules of law.

What is claimed is:

1. A supersonic kinetic energy projectile intended to be launched toward a selected target, comprising a projectile body, a plurality of fins attached to the projectile body to provide stability thereto in flight, spoilers means attached to the projectile body ahead of each of said fins for reducing the temperature of the fins during flight of the projectile, and thereby, the turning of the fins in flight, and wherein said fins being main fins, and said spoiler means comprising a plurality of advance fins, each being associated with and being mounted ahead of a respective one of said main fins, and a predetermined gap between each of said advance fins and the associated trailing one of said main fins, and wherein each of said advance fins and the associated trailing one of said main fins are formed from a single sheet of material, and are connected by a portion of said material beneath said gap.

2. The invention according to claim 1, wherein said predetermined gap between each of said advance fins and the associated trailing one of said main fins is selected to have a width suitable to create recirculating vortices behind the trailing edge of said advance fin sufficient to cool the leading edge of the associated main fin.

3. The invention according to claim 1, including at least one additional gap in the tip of each of said main fins.

4. A high speed, slender vehicle comprising a vehicle body, at least one primary fin mounted for deployment on said body to provide stability thereto in flight, and spoiler fin means mounted ahead of said primary fin for shielding said primary fin from direct exposure to incoming flow for cooling thereof during flight of the vehicle, a gap of predetermined width between the trailing edge of said spoiler fin means and the leading edge of said primary fin, and wherein said spoiler fin means and said primary fin are connected by a sheet of material common to both beneath said said gap.

5. The invention according to claim 4, wherein said predetermined width of said gap is selected to produce recirculating vortices behind the trailing edge of said spoiler fin means sufficient to cool the leading edge of said primary fin.

6. The invention according to claim 4, including at least one additional gap in the tip of said primary fin.

* * * * *